United States Patent [19]

Roy et al.

[11] 4,431,941
[45] Feb. 14, 1984

[54] FLUORESCENT LAMP HAVING DOUBLE PHOSPHOR LAYER

[75] Inventors: Joseph A. Roy; Fred R. Taubner, both of Danvers, Mass.

[73] Assignee: GTE Products Corporation, Stamford, Conn.

[21] Appl. No.: 47,434

[22] Filed: Jun. 11, 1979

[51] Int. Cl.³ .............................................. H01J 61/48
[52] U.S. Cl. .................................................... 313/487
[58] Field of Search ........................................ 313/487

[56] References Cited

U.S. PATENT DOCUMENTS

| 3,602,757 | 8/1971 | Wachtel | 313/487 |
| 3,602,758 | 8/1971 | Thornton et al. | 313/487 |
| 4,088,923 | 5/1978 | Manders | 313/487 |

*Primary Examiner*—Palmer C. Demeo
*Attorney, Agent, or Firm*—William H. McNeill; James Theodosopoulos

[57] ABSTRACT

A fluorescent lamp has two phosphor layers, the phosphor of the first layer being less expensive than the phosphor of the second layer. The second phosphor layer improves the lamp efficiency.

2 Claims, 1 Drawing Figure

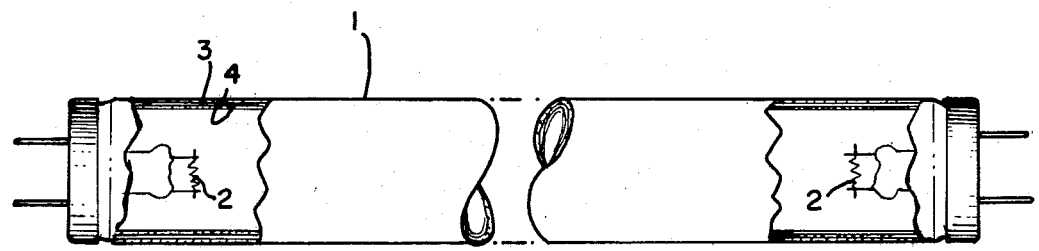

FLUORESCENT LAMP HAVING DOUBLE PHOSPHOR LAYER

THE INVENTION

This invention is concerned with fluorescent lamps having two phosphor layers, one superposed on the other. Such superposed double layers are used to improve maintenance or to reduce phosphor cost and are shown in U.S. Pat. Nos. 3,602,757, 3,602,758 and 4,088,923.

In U.S. Pat. No. 3,602,757 the first or outer phosphor layer provides a desired color of light but has low lamp maintenance. The second or inner layer has high maintenance and serves to screen the outer layer from damaging short wavelength radiation from the arc discharge, thereby improving lumen maintenance of the lamp.

In U.S. Pat. No. 3,602,758, the outer phosphor layer comprises relatively inexpensive material while the inner phosphor layer comprises more expensive material. This arrangement permits use of less of the expensive material necessary to provide a desired spectral energy distribution than if both materials had been blended and applied as a single layer.

U.S. Pat. No. 4,088,923 also involves use of an outer layer of inexpensive phosphor and an inner layer of more expensive phosphor. The patent is concerned with the color of the light emitted by the lamp and discloses that the inner layer should be sufficiently thick to convert at least 80% of the ultraviolet radiation from the arc discharge into light.

In our invention a primary consideration is lamp efficiency in relation to the economies of the marketplace. It is desired to provide fluorescent lamps that are more efficient than those generally in greatest present use, because of the energy shortage situation. But the lamps must be provided at a price sufficiently economical to make them accepted. Therefore this invention provides a lamp in which the inner phosphor layer, which is more efficient in converting ultraviolet radiation into visible light than is the outer phosphor layer, is so thin that it converts less than 80% of the discharge radiation into light, the remainder penetrating to the outer layer. But since the expensive inner phosphor can cost about forty times more than the outer phosphor, use of a lesser amount of the inner phosphor permits a lamp price that finds acceptance in the marketplace. The amount of inner phosphor should be within the range of that where a small increase in the quantity of said phosphor results in a greater increase proportionately in the efficiency of the lamp, but it should also provide a significant increase in efficiency. This range is about 3 to 18%, that is to say, the amount of the expensive inner phosphor, which comprises an efficient blend of line emitting or narrow band emitting phosphors, should be in the range of about 3 to 18 weight percent of the total phosphor in both layers.

The drawing shows a fluorescent lamp, partly in section, in accordance with this invention.

The lamp comprises a sealed glass envelope 1 having electrodes 2 at each end. Envelope 1 contains the usual discharge sustaining filling of mercury and inert gas. Disposed on the inner wall of envelope 1 is a first, or outer, layer 3 of phosphor. A second, or inner, phosphor layer 4 is superposed on layer 3. The phosphor layer 3 can comprise a calcium and/or strontium halophosphate activated by antimony and/or manganese such as is commonly used in fluorescent lamps. The phosphor layer 4 can comprise the tricomponent phosphor disclosed in U.S. Pat. No. 4,088,923, namely, a blend of red-emitting yttrium oxide activated by trivalent europium, green-emitting cerium magnesium aluminate activated by trivalent terbium and blue emitting barium magnesium aluminate activated by divalent europium.

In one example, phosphor layer 3 was a cool white halophosphate comprising cadmium calcium fluorochlorophosphate activated by manganese and antimony. Phosphor layer 4 comprised the above mentioned tricomponent blend of red-, green-, and blue-emitting phosphors in the ratio of 48:41:11. The light output of a highly current-loaded 5 foot 58 watt T8 lamp with only phosphor layer 3 thereon was 4560 lumens. When phosphor layer 4 was superposed thereover, in the amount of 0.6 grams of phosphor layer 4 on 5.3 grams of phosphor layer 3, which is equivalent to 10.1 weight percent of the tricomponent phosphor as previously defined, the light output increased to 5000 lumens, an increase of 440 lumens. At 3 weight percent of the tricomponent phosphor, the light output would be about 4720 lumens, an increase of about 160 lumens. At 18 weight percent, the light output would be about 5230 lumens, an increase of 670 lumens. The efficiency of the tricomponent phosphor in converting ultraviolet radiation into visible light is about 18% greater than that of the halophosphate.

We claim:

1. A fluroescent lamp comprising a glass envelope having electrodes at its ends and containing a discharge-sustaining and ultraviolet-radiation-emitting filling of mercury and inert gas, a first phosphor layer disposed on the inner envelope surface and a second phosphor layer superposed on the first phosphor layer, the phosphor of the first layer being less expensive than the phosphor of the second layer, the phosphor of the second layer being between about 3 to 18 weight percent of the total phosphor in both layers so that less than 80% of the ultraviolet radiation is converted into visible light by the second phosphor layer, the remaining ultraviolet radiation penetrating through to the first phosphor layer, the efficiency of the lamp in converting ultraviolet radiation into visible light being greater because of the double phosphor layer than if only the first phosphor layer were present.

2. The lamp of claim 1 wherein the phosphor of the second layer comprises a blend of line emitting or narrow band emitting phosphors, the efficiency of said blend in converting ultraviolet radiation into visible light being greater than the efficiency of the phosphor in the first layer.

* * * * *